United States Patent
Morishita

(10) Patent No.: US 11,475,115 B2
(45) Date of Patent: Oct. 18, 2022

(54) LOGIN DEVICE AND DISPLAY METHOD

(71) Applicant: SHARP KABUSHIKI KAISHA, Sakai (JP)

(72) Inventor: Masahiro Morishita, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 150 days.

(21) Appl. No.: 16/808,839

(22) Filed: Mar. 4, 2020

(65) Prior Publication Data
US 2020/0285727 A1  Sep. 10, 2020

(30) Foreign Application Priority Data
Mar. 8, 2019 (JP) .............................. JP2019-042508

(51) Int. Cl.
| G06F 3/12 | (2006.01) |
| G06F 21/33 | (2013.01) |
| H04N 1/00 | (2006.01) |
| G06F 21/45 | (2013.01) |

(52) U.S. Cl.
CPC .............. *G06F 21/33* (2013.01); *G06F 21/45* (2013.01); *H04N 1/00854* (2013.01)

(58) Field of Classification Search
CPC .......... G06F 21/33; G06F 21/45; G06F 21/31; G06F 3/0482; G06F 3/04817; G06F 3/0484; H04N 1/00854
See application file for complete search history.

(56) References Cited

U.S. PATENT DOCUMENTS

| 2008/0005239 A1* | 1/2008 | Podl ....................... G06Q 10/10 709/204 |
| 2015/0304121 A1* | 10/2015 | Wu ..................... H04L 12/1822 709/204 |
| 2016/0006895 A1* | 1/2016 | Hikichi ................. G06F 1/3293 358/1.13 |
| 2018/0300090 A1* | 10/2018 | Lin ....................... G06F 3/1207 |
| 2019/0018970 A1* | 1/2019 | Narita ................... G06F 3/1238 |
| 2019/0139002 A1* | 5/2019 | Kumar .................. H04L 65/403 |
| 2019/0182399 A1* | 6/2019 | Yasukawa .......... H04N 1/00344 |

FOREIGN PATENT DOCUMENTS

| JP | 2016-124104 A | 7/2016 |
| JP | 2017-202669 A | 11/2017 |

* cited by examiner

*Primary Examiner* — Huo Long Chen
(74) *Attorney, Agent, or Firm* — ScienBiziP, P.C.

(57) ABSTRACT

To provide a login device including a controller, a storage that stores a user capable of a login, where the user includes a plurality of the users, a display device that displays specific displays corresponding to the users, in a display screen, and a processing device that executes a login process with a user corresponding to a specific display selected from the displayed specific displays. If job data including user information is acquired, the controller provides an identifiable display on a specific display for a user corresponding to the user information.

6 Claims, 15 Drawing Sheets

FIG. 3

| ITEM | VALUE |
|---|---|
| LOGIN NAME | USER 1 |
| E-mail | user1@example.com |
| PASSWORD | kjd2kd |
| ICON IMAGE | man012.bmp |

LOGIN DEVICE AND DISPLAY METHOD

BACKGROUND OF THE INVENTION

Field of the Invention

The present invention relates to a device, and in particular, a login device.

This Nonprovisional application claims priority under 35 U.S.C. § 119(a) on Patent Application No. 2019-42508 filed in Japan on 8 Mar. 2019, the entire contents of which are hereby incorporated by reference.

Description of the Background Art

For example, a known invention is an image forming apparatus for receiving job data including user information to form an image, and the image forming apparatus is configured so that the user information acquired from the job data is registered and a login screen including an icon corresponding to the registered user information is displayed (see, for example, Japanese Unexamined Patent Application Publication No. 2017-202669 (Patent Document 1) and Japanese Unexamined Patent Application Publication No. 2016-124104 (hereinafter, Patent Document 2)).

Patent Document 2 discloses an invention in which icons of users are rearranged according to priority.

In an example, a login screen of a device is in an initial state, and thus, a user often needs to grasp a position where a user icon is displayed and selects the user icon at the position to perform a login process. If the position of the icon is uniformly changed according to the priority or the like, the user needs to search for the icon each time, which causes a problem that the usability is lowered.

In view of the above-described problem, an object of the present invention is to provide a device, and in particular, a login device capable of displaying a display screen with high usability for a user who performs a login process.

SUMMARY OF THE INVENTION

A login device according to the present invention is a login device including a controller, a storage that stores a user capable of a login, where the user includes a plurality of the users, a display device that displays specific displays corresponding to the users, in a display screen, and a processing device that executes a login process with a user corresponding to a specific display selected from the displayed specific displays, in which if job data including user information is acquired, the controller provides an identifiable display on a specific display of a user corresponding to the user information.

A login device according to the present invention is a login device for logging into a processing device, and the login device includes a controller, a storage that stores a user capable of a login, where the user includes a plurality of the users, a display controller that displays specific displays corresponding to the users, a processing device that executes a login process with a user corresponding to a specific display selected from the displayed specific displays, and a determiner that determines whether the user is in a state of operating the processing device, in which the controller changes a display manner of a specific display corresponding to a user, according to a state of the user determined by the determiner.

A display method according to the present invention is a display method in a login device including a storage that stores a user capable of a login, where the user includes a plurality of the users, and the method includes displaying, in a display screen, specific displays corresponding to the users, and executing a login process with a user corresponding to a specific display selected from the displayed specific displays, in which if job data including user information is acquired, a specific display of a user corresponding to the user information is provides with an identifiable display.

A display method according to the present invention is a display method in a login device including a storage that stores a user capable of a login, where the user includes a plurality of the users, the login device for logging into a processing device, and the method includes displaying specific displays corresponding to the users, executing a login process with a user corresponding to a specific display selected from the displayed specific displays, and determining whether the user is in a state of operating the processing device, in which a display manner of a specific display corresponding to a user is changed according to the determined state of the user.

According to a login device of the present invention, in the device for displaying specific displays corresponding to users in a display screen and executing a login process with a user corresponding to a specific display selected from the displayed specific displays, if job data including user information is acquired, it is possible to provide an identifiable display on a specific display of a user corresponding to the user information. This allows a user to easily confirm a user who has job data, at login.

BRIEF DESCRIPTION OF THE DRAWINGS

FIG. 3 is a table illustrating an example of a structure of user information according to the first embodiment;

DESCRIPTION OF THE PREFERRED EMBODIMENTS

An embodiment for carrying out the present invention will be described with reference to the drawings below. In the present embodiment, as an example, a case where a login device (login function) is applied to an image forming apparatus such as a digital multifunctional apparatus will be described.

A device to which the present invention is applicable may be any device that executes a login function, and the present invention can apply to an image forming apparatus such as a digital multifunctional apparatus, a printer, and a FAX machine, to an information processing apparatus such as a smartphone and a tablet, and to a server device connected to an online system.

Further, a processing device into which a user logs may be separately provided. For example, a program having a login function may be installed in a smartphone, and the user may log into a target processing device (for example, an image forming apparatus or a server device).

1. First Embodiment

1.1 Configuration

First, a functional configuration of an image forming apparatus 10 including a login device (login function) will be described with reference to FIG. 1.

Figure 1:
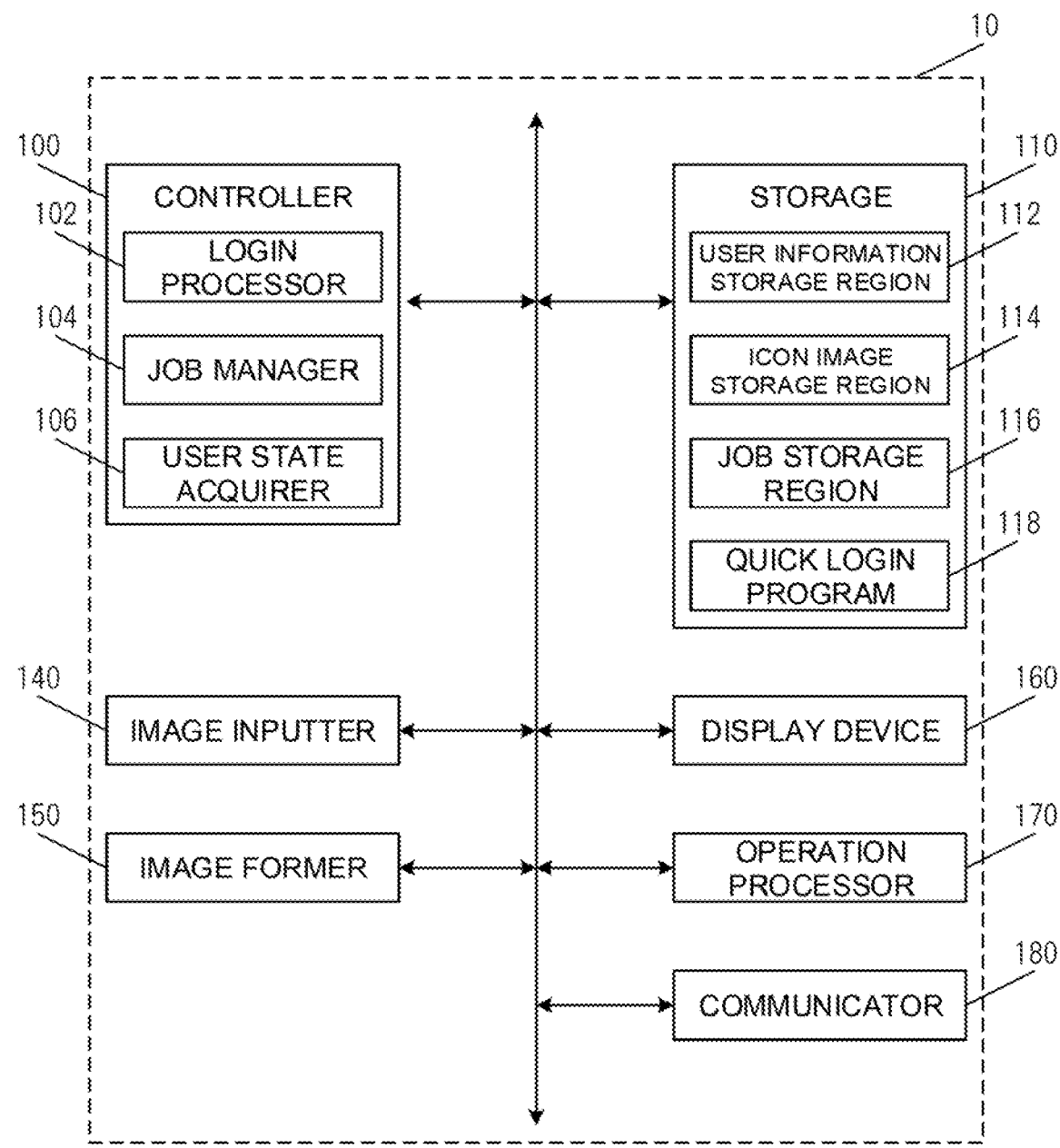
FIG. 1 is a diagram for explaining a functional configuration of an image forming apparatus according to a first embodiment.

As illustrated in FIG. 1, the image forming apparatus 10 includes a controller 100, a storage 110, an image inputter 140, an image former 150, a display device 160, an operation processor 170, and a communicator 180.

The controller 100 controls the whole image forming apparatus 10. The controller 100 realizes various functions by reading and executing various programs stored in the storage 110, and includes, for example, a central processing unit (CPU) being one or more arithmetic devices.

Further, the controller 100 serves as a login processor 102, a job manager 104, and a user state acquirer 106 by reading and executing programs from the storage 110.

The login processor 102 executes a user login process and a user authentication. For example, when the user logs into the image forming apparatus 10, the logged-in user executes various processes. A process in which the user logs into/out of the apparatus is referred to as "login process".

When executing a login process, the login processor 102 provides a normally performed login function (hereinafter, "normal login function") and a quickly performed login function (hereinafter, "quick login function") in the present embodiment.

Figure 2A:
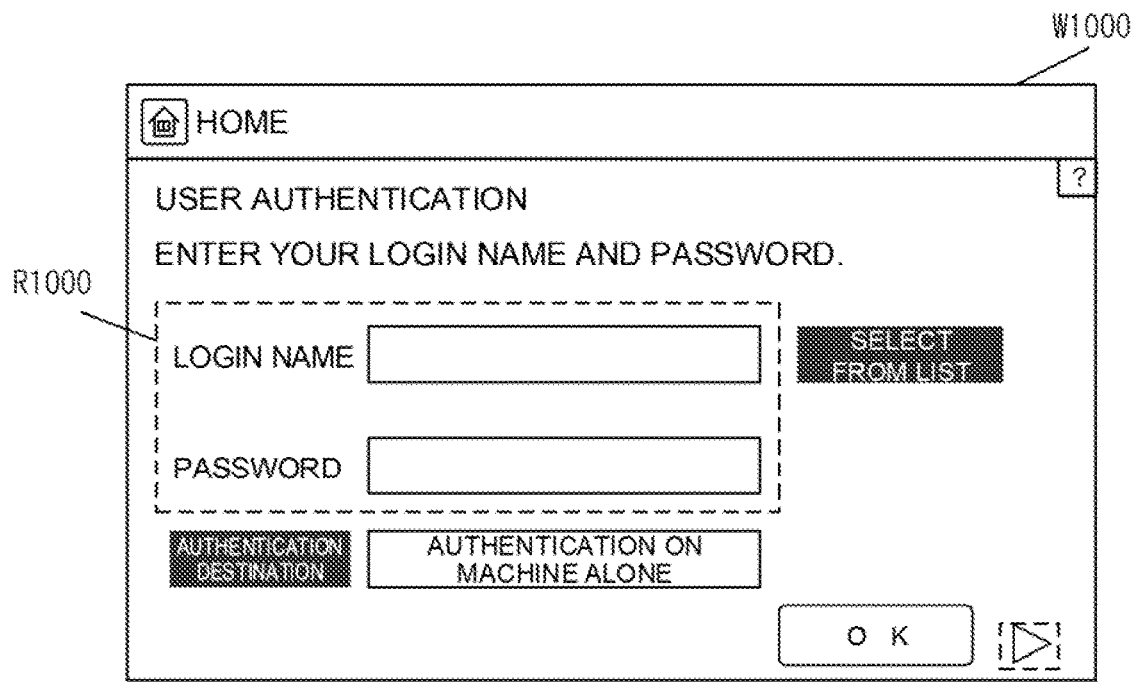
FIG. 2A and FIG. 2B are diagrams each for illustrating an example of a login display screen according to the first embodiment.

The normal login function is used by a user to log into the apparatus by inputting a login name, a password, and the like. For example, FIG. 2A is a diagram illustrating an example of a screen W1000 provided for the normal login function.

In the screen W1000, fields for inputting a user's login name and password are displayed in a region R1000. The user inputs login information being information necessary for the login, into the region R1000. The login processor 102 executes the login process, based on the login information.

The quick login function is used by a user to log into the apparatus by selecting icons displayed in a list. For example, FIG. 2B is a diagram illustrating an example of a screen W1100 provided for the quick login function.

In the screen W1100, a user-specific display indicating a user is displayed in a grid pattern (grid) in the region R1100. Here, the user-specific display is a display for identifying the user. In the present embodiment, an icon and a user name are displayed for the user-specific display. In the concept of an icon, an icon includes a character, a figure, and a symbol, and may be represented by a text or an image.

Figure 2B:
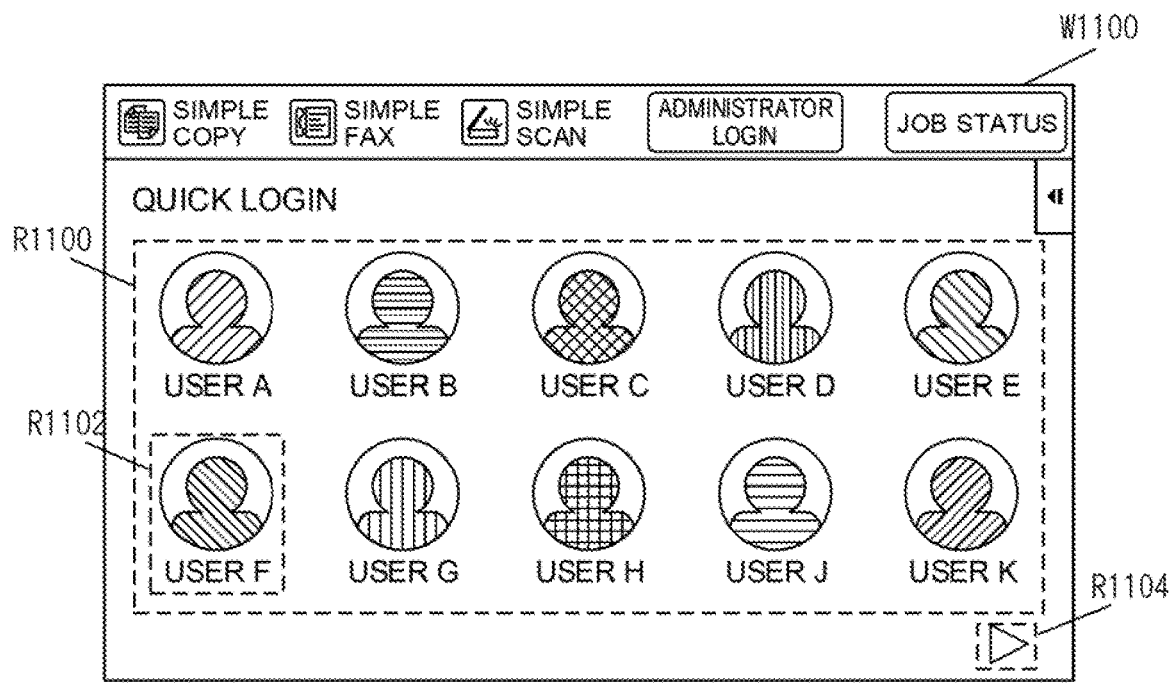

Further, the screen W1100 in FIG. 2B displays the icon and the user name for the user-specific display, but either one of the icon and the user name may be displayed. In the screen W1100 in FIG. 2B, the user-identifiable display includes a plurality of the user-identifiable displays, and the user-identifiable displays are arranged and displayed in a grid pattern, but may be displayed in another manner such as a list display.

That is, the user selects a user who wishes to log in the apparatus from among users identified by icons or user names being user-specific displays displayed in a list in the region R1100. For example, the login processor 102 executes a login process for a user F when an icon in a region R1102 (for example, "user F") is selected by the user.

It is noted that if there are too many users to be displayed in the region R1100, the login processor 102 may display users in a separate screen. For example, if a region R1104 is touched by a user, the login processor 102 switches the current page to a next page to display a list of users.

The job manager 104 manages a job. The job manager 104 executes or deletes jobs stored in the job storage region 116a, or changes the priority of the jobs. Here, the job is a unit of a process executed by the image forming apparatus 10, and means, for example, one process/operation such as copying, scanning, and faxing.

Also, the job is input when a user operates the image forming apparatus 10 or is input from another terminal device via the communicator 180. The input job is stored in the job storage region 116. The job manager 104 reads a job from the job storage region 116 and executes the job.

The user state acquirer 106 acquires, as a user state, whether a user is present (in a present state) or absent (in an absent state). Here, the absent state is a state in which the user is in a state of not operating the image forming apparatus 10. For example, the absent state includes a state where the user is not at his or her desk, a state where a terminal device used by the user is not available, a state where the user is not in a room where the image forming apparatus 10 is provided, and a state where the user is not near the image forming apparatus 10.

Therefore, if the terminal device used by the user is not connected to the image forming apparatus 10 or if the terminal device used by the user is not detectable on a network, for example, the user state acquirer 106 may acquire a user absent state. Further, if a presence of the user is not detectable by an attendance management system, an access management system, a camera, or the like, the user state acquirer 106 may acquire a user absent state where the image forming apparatus 10 is not usable by the user.

A user present state (a state where a user is present) means a state where the user is in a state of operating the image forming apparatus 10, for example. Examples of a method for acquiring a present user include a method of calculating present users by subtracting the number of absent users from the number of users stored in the user information, and a method of acquiring a present user from a state in which the terminal device used by the user is turned on. Further, if a present user is detectable by the attendance management system or the access management system, for example, the user state acquirer 106 may acquire a present user at a place where the image forming apparatus 10 is provided.

The storage 110 stores various programs and various data necessary for an operation of the image forming apparatus 10. The storage 110 includes a semiconductor memory such as a solid state drive (SSD), a hard disk drive (HDD), and the like. Further, instead of the storage device of the image forming apparatus 10, a storage region may be provided in, for example, a network attached storage (NAS) or a cloud server connected via a network.

In addition, the storage 110 includes a user information storage region 112, an icon image storage region 114, and a job storage region 116, and stores a quick login program 118.

The user information storage region 112 stores user information. FIG. 3 is a diagram illustrating an example of a data structure of the user information. A value is stored for each item of the user information. In the present embodiment, user information items include a login name (for example, "user 1"), an email (for example, "user1@example.com"), a password (for example, "kjd2kd"), and an icon image (for example, "man012.bmp").

The items may include another item such as an identification number, an organization to which a user belongs, and an extension number in addition to those in FIG. 3, and may not include a password. In addition, the user information may include a required item such as a login name and an icon image.

The icon image storage region 114 stores an icon image displayed for identifying a user. The icon image is, for example, an image file in the BMP, PNG, GIF, or JPG format, but has a concept that a character such as a character text and a symbol may be included where necessary. The icon image may be stored in advance or may be created by a user.

A job input by a user is stored in the job storage region 116. Further, as in a process control, the image forming apparatus 10 may create a job.

The quick login program 118 is a program for realizing a quick login function. The controller 100 executes the quick login process according to the quick login program 118. It is noted that when the quick login program 118 is installed in another device, the other device realizes the quick login function.

The image inputter 140 reads an image of a document to generate image data, and includes, for example, a scanner device provided with a device that converts optical information of a charge coupled device (CCD) or the like into an electrical signal. The image inputter 140 may fetch, from outside, an image captured by a digital camera in addition to the scanner device or the like, and may accept (receive) document data from another terminal via a storage medium such as a USB memory and a compact flash (registered trademark) and the communicator 180.

The image former 150 forms image data on a recording medium (for example, a recording sheet). For example, the image former 150 forms an image on a surface of a recording sheet fed from a sheet feed tray and discharges the sheet from a sheet discharge tray. The image former 150 includes, for example, a laser printer or the like utilizing an electrophotographic method.

In the present embodiment, the image former 150 will be described, in an example, as a device for forming and outputting an image on a recording sheet, but may output an image in a file form which may be stored in a USB memory or saved in a cloud server.

The display device 160 displays various types of information provided by the image forming apparatus 10 and displays a content to be notified to a user. The display device 160 includes, for example, a display using a liquid crystal display (LCD) or an organic light emitting diode (OLED) such as an organic electroluminescence (EL). The display device 160 may be an external display device or another terminal device connectable via the communicator 180. For example, a display screen displayed by the display device 160 may be displayed as a WEB screen on a computer when the image forming apparatus 10 is accessed from the computer using a WEB browser.

The operation processor 170 receives an operation input from a user. For example, the operation processor 170 includes a hardware key or a software key using a touch panel. As long as the operation processor 170 receives an operation input from a user, the operation processor 170 may employ a voice input, an eye controlled focus system, or the like.

The communicator 180 is an interface capable of communicating with another device, for example, the communicator 180 is connectable to another device or connected to a network. The connection may be either wired or wireless connection. For example, the communicator 180 is communicable with another information processing apparatus and another image forming apparatus, and communicable with a server. The communicator 180 is connectable and communicable with an input device such as a digital camera and a scanner, or a display device such as an external display.

A well-known communication method such as wired/wireless LAN, USB, HDMI (registered trademark), LTE/5G/WiMAX mobile communication network may be used for a communication method of the communicator 180. Further, a plurality of interfaces and communication control devices may be provided for each of different communication methods.

Needless to say, the above-described configuration may be provided as necessary or an additional component may be added. For example, if it is not necessary to acquire the user state, the user state acquirer 106 is unnecessary, and if the image forming apparatus 10 is connected to an external display device, the display device 160 is unnecessary.

On the other hand, for example, if serving as a wireless LAN access point, the image forming apparatus 10 may include a base station device or may include an image processor that performs a general image process. That is, FIG. 1 is an example, and functional components that can be assumed by those skilled in the art may be selected as necessary.

1.2 Processing Flow

A flow of processing in the present embodiment will be described below.

1.2.1 Quick Login Process

Figure 4:
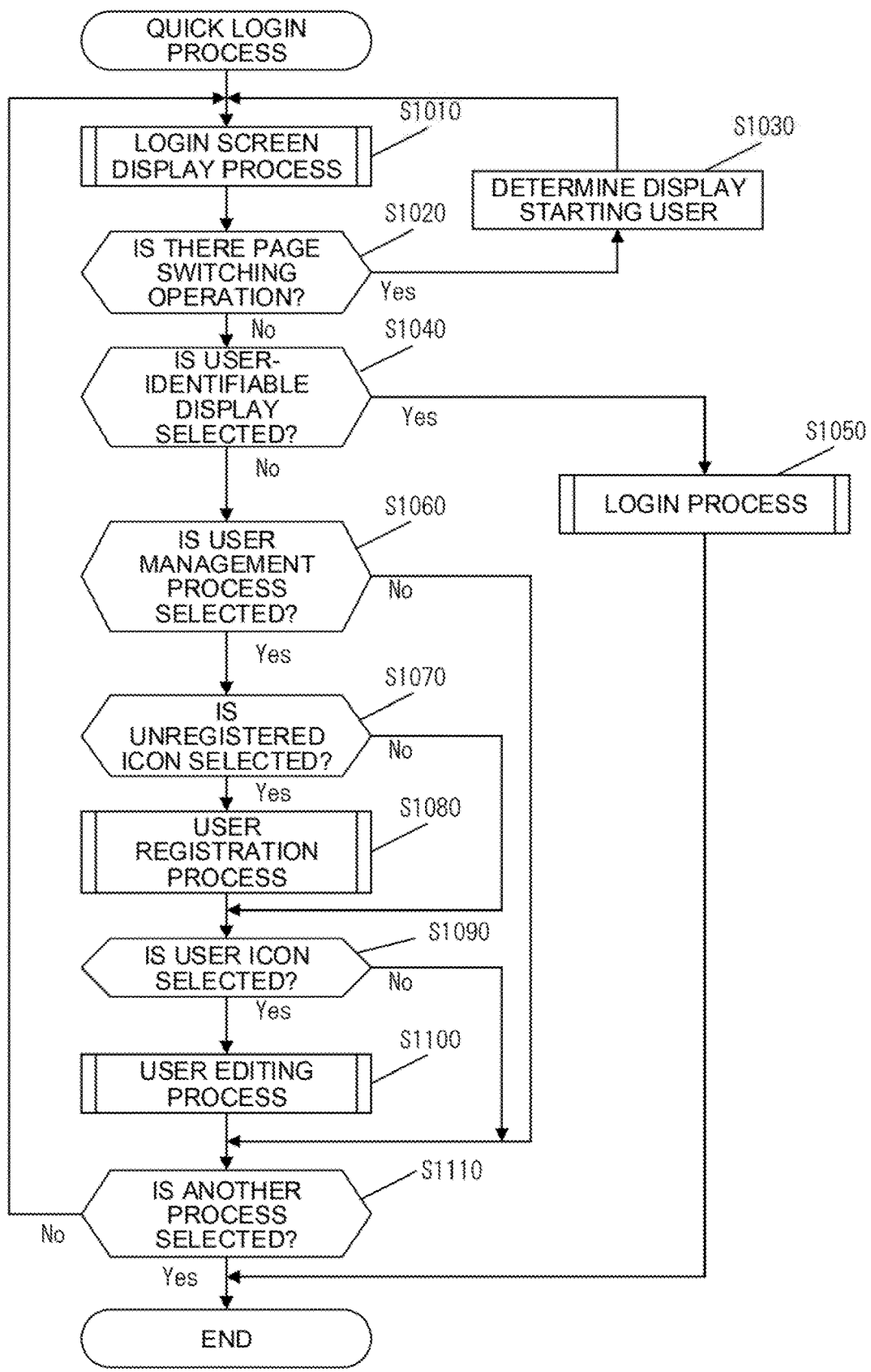
FIG. 4 is a flowchart for explaining a quick login process according to the first embodiment.

The quick login process executed by the controller 100 (login processor 102) will be described below with reference to an operation flow in FIG. 4.

First, the controller 100 executes a login screen display process (step S1010). The controller 100 executes the login screen display process to display a login screen for a display screen in the display device 160.

Next, if detecting a page switching operation by a user (step S1020; Yes), the controller 100 determines a display starting user and executes the login screen display process again (step S1030 → step S1010). The display starting user described above is a user displayed first in a quick login screen. For example, if first to tenth users are displayed, the first user is the display starting user. Further, if 11th to 20th users are displayed, the 11th user is the display starting user.

For example, if ten users are displayable in the login screen, the controller 100 displays the first to tenth users. Here, if a page switching operation is detected, the controller 100 displays the 11th to 20th users in turn. Thus, the controller 100 displays a list of displayable users, starting from the display starting user, in the login screen.

Here, in the login screen, a position of the user-specific display is preferably fixed. That is, if the first to tenth users are displayed, these users are displayed in this order unless a user is added or deleted. As a result, even if the user does not check each user name one by one, the user easily finds a name of a user who wishes to log in the apparatus to perform a login process by remembering the display position of the icon.

Next, the controller 100 determines whether or not a user-specific display is selected (step S1040). Examples of the user-specific display include an icon or a user name.

If a user-specific display is selected (step S1040; Yes), the controller 100 executes the login process (step S1050).

If a user management process is selected by the user (step S1040; No → step S1060; Yes), the controller 100 executes the user management process. Here, the user management process includes a user registration process for newly registering a user and a user editing process for editing a registered user.

Here, the controller 100 executes the user registration process if an unregistered icon is selected from among the icons currently displayed in the display device 160 (step S1070; Yes → step S1080).

In addition, if the icon of a user is selected from among the icons displayed in the display device 160, the controller 100 executes the user editing process (step S1070; No → step S1090; Yes → step S1100).

If a process other than the processes described above is selected, the controller 100 ends the quick login process (step S1110; Yes). If no other process is selected, the controller 100 repeatedly executes the quick login process (step S1110; No → step S1010).

1.2.2 Login Screen Display Process

The controller 100 (login processor 102) executes a login screen display process to display a login screen used when a user logs into the apparatus, in the display device 160. The login screen display process will be described with reference to FIG. 5.

Firstly, the controller 100 reads user information (step S102). Specifically, the controller 100 reads, from the user information storage region 112, the user name and the icon of user information to be displayed first. The controller 100 reads, from the user information storage region 112, user information items for the number of users displayable in a list in the display device 160.

Next, the controller 100 displays a list of user-specific displays (step S104). That is, the controller 100 displays a list of user icons, together with user names, of the user information read from the user information storage region 112, and a list of either the user icons or the user names. Further, the controller 100 may display a list of information items (for example, user identification information and machine name information) other than above. Further, the controller 100 may switch and display a display manner and display items according to an operation instruction from the user and a state of the display device 160.

In addition, the controller 100 (job manager 104) acquires a job state from the job storage region 116 (step S106). Here, if there is a job corresponding to the user associated with the currently displayed user-specific display (step S108; Yes), the controller 100 provides an identifiable display on the user-specific display of the corresponding user (step S110).

Figure 6:
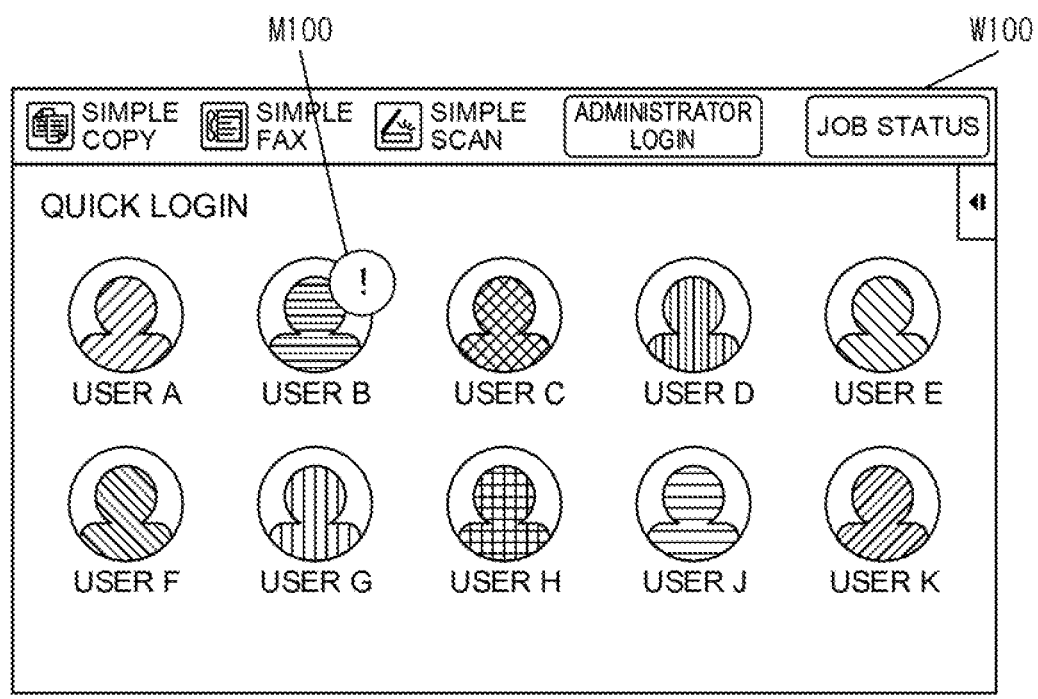
FIG. 6 is a diagram for explaining an operation of the login screen display process according to the first embodiment.

FIG. 6 is a diagram illustrating an example of a display screen W100. The controller 100 displays a list of ten users in the display screen W100. In the display screen W100, the icon of each of the users (user icon) and the user name are displayed together.

For example, the controller 100 displays an identifiable display M100 over the user icon with a user name "user B" to indicate that there is a job corresponding to the user with the user name "user B". When the user visually recognizes the identifiable display M100, the user understands that the user with the user name "user B" has a job.

It is noted that the controller 100 may display an icon or symbol "!" to be superimposed over the user icon with the user name "user B" for the identifiable display, as illustrated in FIG. 6. In addition, other than above, the controller 100 may provide an identifiable display on the user icon by, for example, various methods such as the user name is highlighted, a color of the user name is changed, or the user name is blinked.

Moreover, the controller 100 may change a display manner, instead of providing the identifiable display on the user-specific display for the user. For example, the specific display for the user may be changed in color or brightness, or may be blinked.

1.2.3 User Registration Process

The controller 100 (login processor 102) executes the user registration process to register (store) the user information into the user information storage region 112.

Figure 7A:
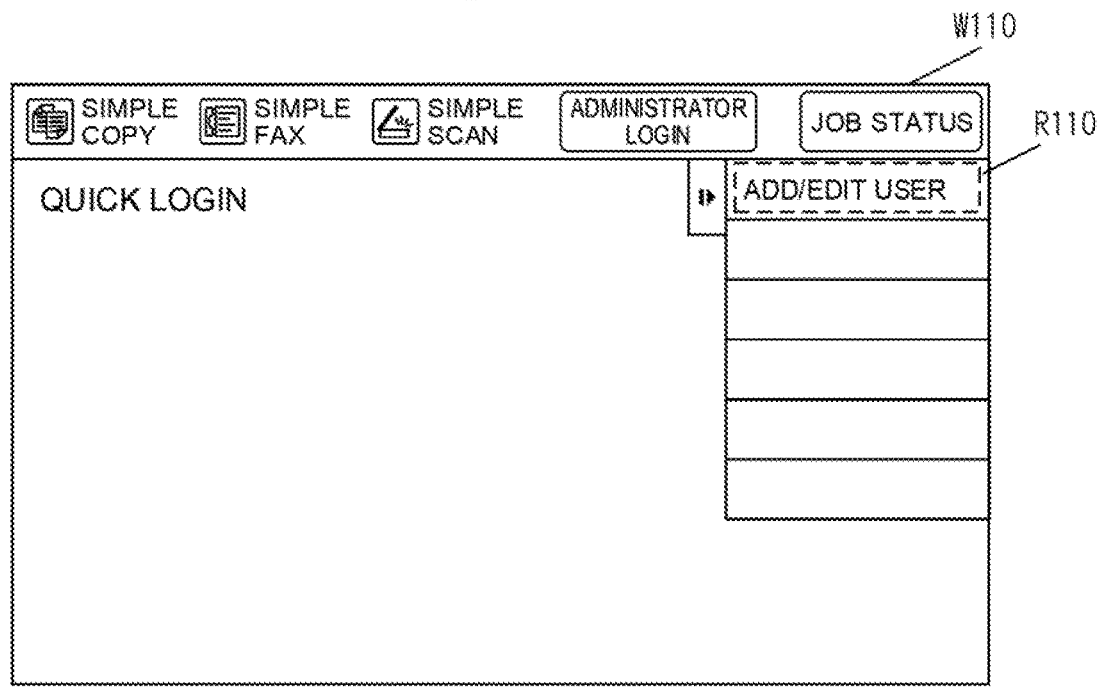
FIG. 7A and FIG. 7B are diagrams each for explaining an operation of a user management process according to the first embodiment.
Figure 7B:
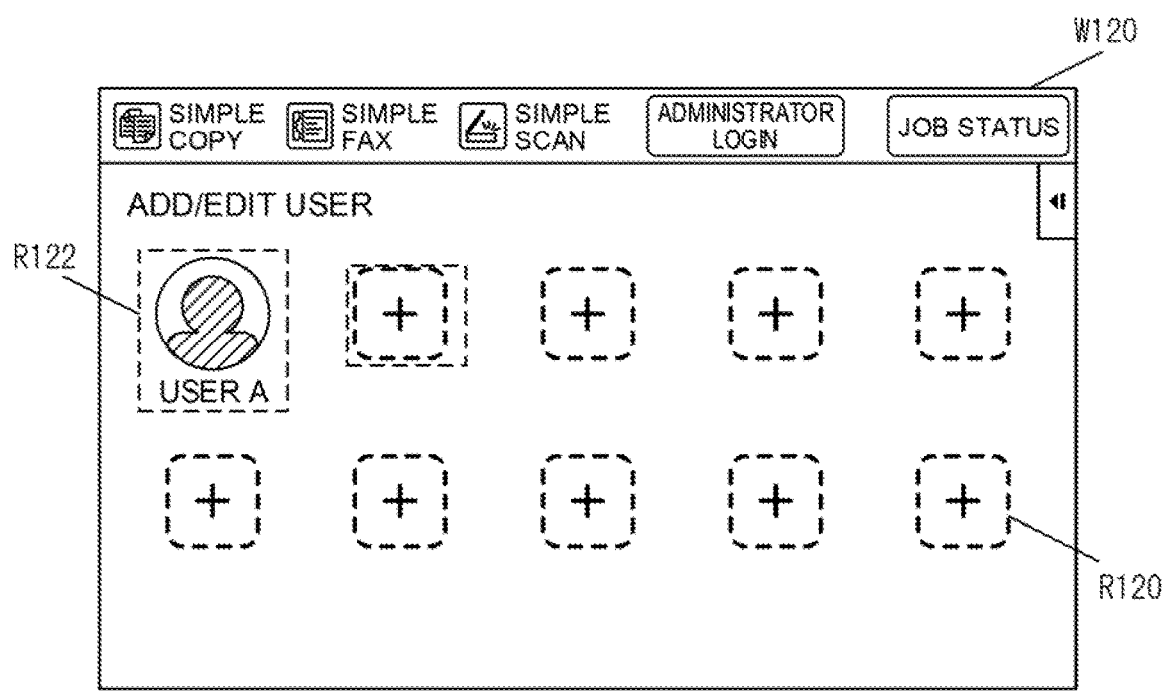

FIG. 7A and FIG. 7B are diagrams each for illustrating an example of a display screen W110 if the controller 100 executes the user management process. If a region R110 is selected by a user in the display screen W110, the controller 100 executes the user management process. At this time, the display screen W110 in FIG. 7A is shifted to a display screen W120 in FIG. 7B.

In the display screen W120 of FIG. 7B, a list of users already stored in the user information storage region 112 is displayed. For example, in FIG. 7B, a user A is displayed. Here, if an unregistered icon displayed in a region R120 is selected by the user, the controller 100 executes the user registration process. Further, if the icon or the user name of each user is selected (for example, a user icon displayed in the region R122 is selected), the controller 100 executes the user editing process. The user editing process will be described later.

Figure 8A:
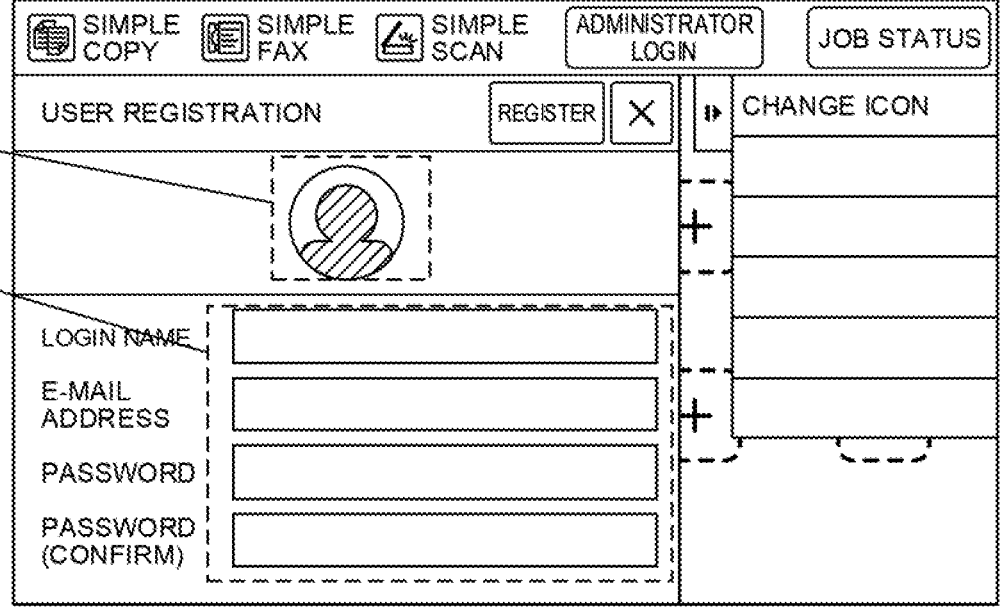
FIG. 8A is a diagram for explaining an operation of a user registration process.

If executing the user registration process, the controller 100 displays a display screen W130 in FIG. 8A. For example, the controller 100 stores a user icon displayed in a region R130 into the user information. Further, the controller 100 stores a value corresponding to an item entered in a region R132, as the user information, into the user information storage region 112.

Figure 9A:
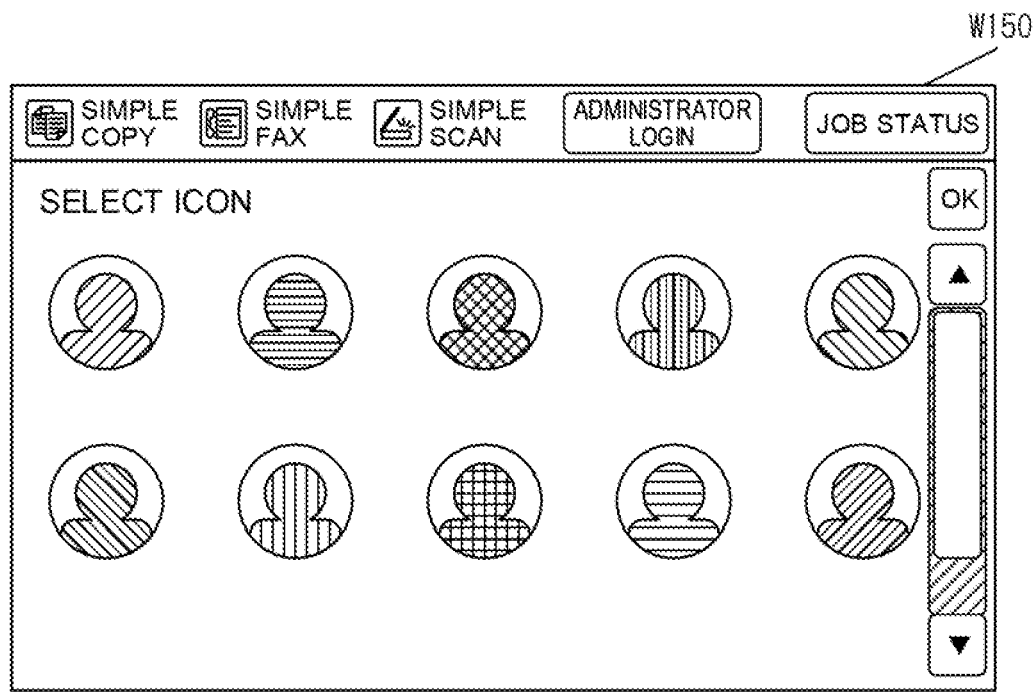
FIG. 9A and FIG. 9B are diagrams each for explaining the operation of the user management process according to the first embodiment.
Figure 9B:
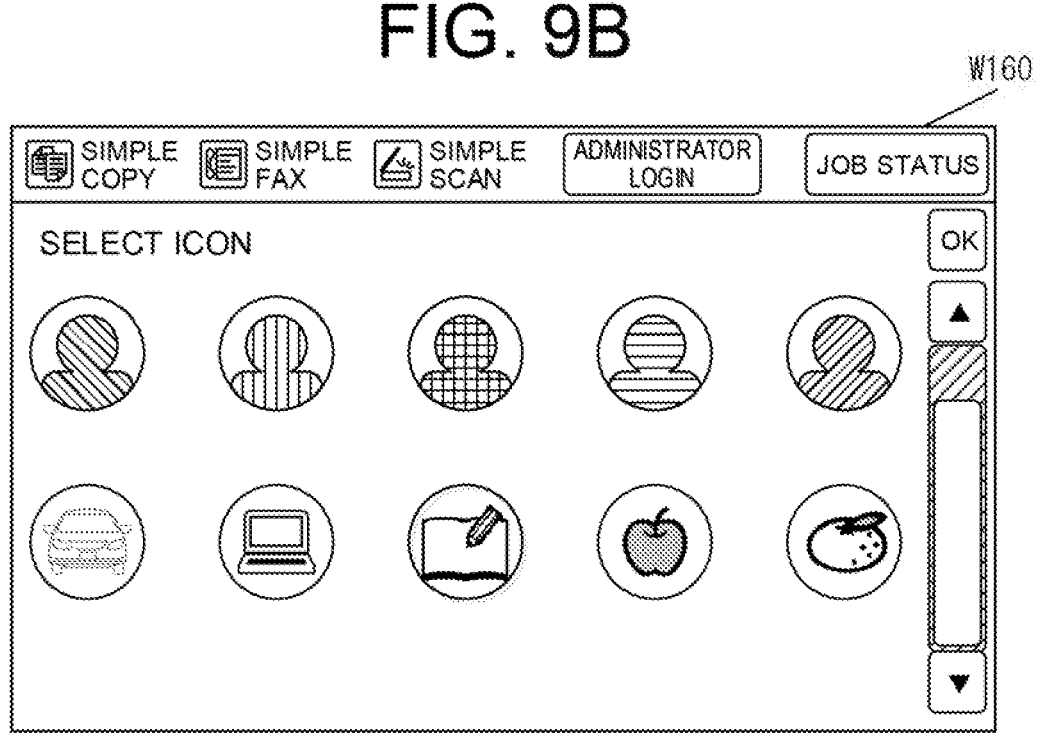

Here, the icon displayed in the region R130 may be selected from a plurality of icons as illustrated in FIG. 9, for example. The user selects one icon from the icons displayed in a display screen W150 in FIG. 9A. Further, if there are a plurality of icons, the icons may be scroll-displayed, and the screen displays may be switched so that a display screen W160 in FIG. 9B is displayed. Additionally, the user creates an icon, reads an icon from another file, or creates an avatar.

1.2.4 User Editing Process

The controller 100 (login processor 102) executes the user editing process to edit the user information stored in the user information storage region 112.

The controller 100 executes the user editing process when the user icon in the region R122 is selected on the display screen W120 in FIG. 7B.

Figure 8B:
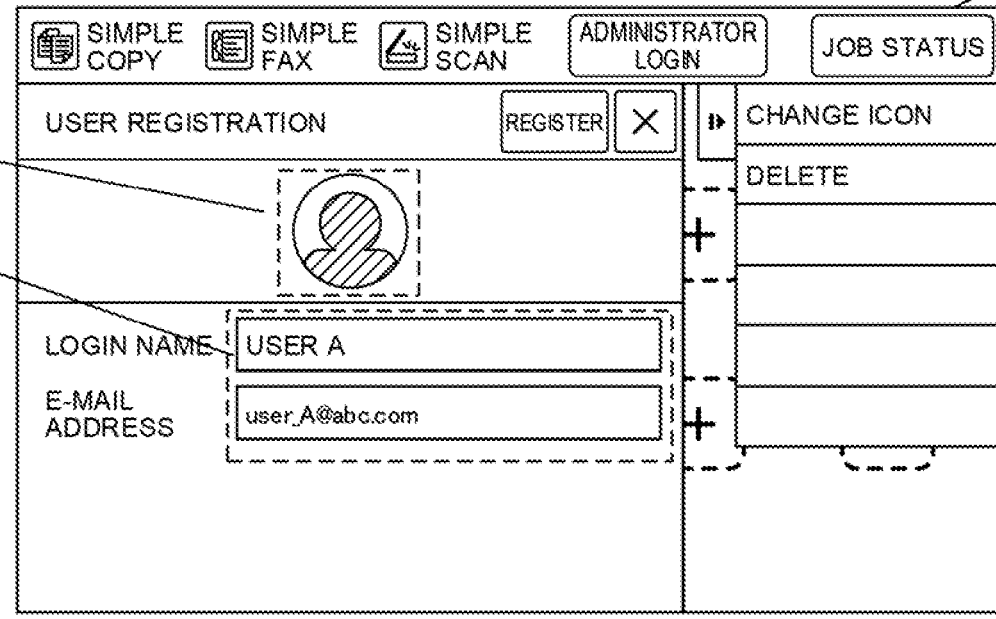
FIG. 8B is a diagram for explaining an operation of a user editing process according to the first embodiment.

FIG. 8B is an example of the display screen W140 displayed when the user editing process is executed by the controller 100. For example, an icon selected by the user is displayed in the region R140. If an operation for changing the icon is executed to select a new icon, the controller 100 updates the user icon. That is, the controller 100 causes the user to select the new user icon and updates the selected icon as the user icon. The user icon is changed when the user selects and executes a process for changing the icon from a menu display. Moreover, the user icon may be changed when the user selects the region R140 and selects and executes a process for changing the icon.

In the display screen W140, already entered items (a login name, and an email address) are displayed in a region R142. If the user inputs new user information into the region R142, the controller 100 updates the already entered items with the input user information.

1.3 Effect

As described above, according to the present embodiment, when the user simply selects the user-specific display (the icon and the user name) displayed in a list serving as the login screen, it is possible to easily log into the apparatus. If there is a job for a user corresponding to the user-specific display displayed in the login screen, it is possible to easily grasp which user has the job by providing an identifiable display on the user-specific display for the user.

In addition, if a user who input a job (for example, a user who input a print job) attempts to use the apparatus, the present invention can provide an effect that it is easy for the user to find his/her icon.

In particular, in a screen in which the position of the user-specific display for the user is fixed, such as a login screen, it is possible to expect an effect that the user easily finds his/her icon, with the identifiable display.

In addition, according to the above-described embodiment, it is possible to identifiably display an icon of a user who has a retention job, a walk-up job, or the like and intends to use a machine from now, without uniformly changing the display position of the icon according to the priority or the like. Consequently, the display position of the icon is not uniformly changed according to the priority or the like, and thus, it is possible for a user who intends to use a machine to easily find his/her icon, as a result of which it is possible to provide an effect that the usability is not lowered.

2. Second Embodiment

A second embodiment will be described. In the second embodiment, a display manner for an absent user (a user who is highly likely not to use the apparatus) among users displayed in a list is changed.

In the present embodiment, configurations common to those in the above embodiment will not be described, and description will be made with a focus on a different configuration and process.

Figure 5:
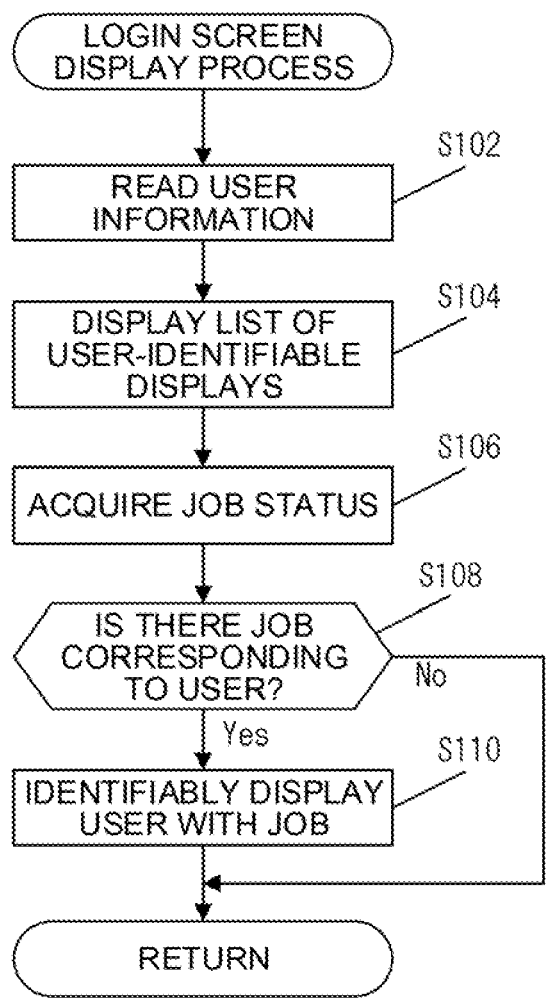
FIG. 5 is a flowchart for explaining a login screen display process according to the first embodiment.
Figure 10:
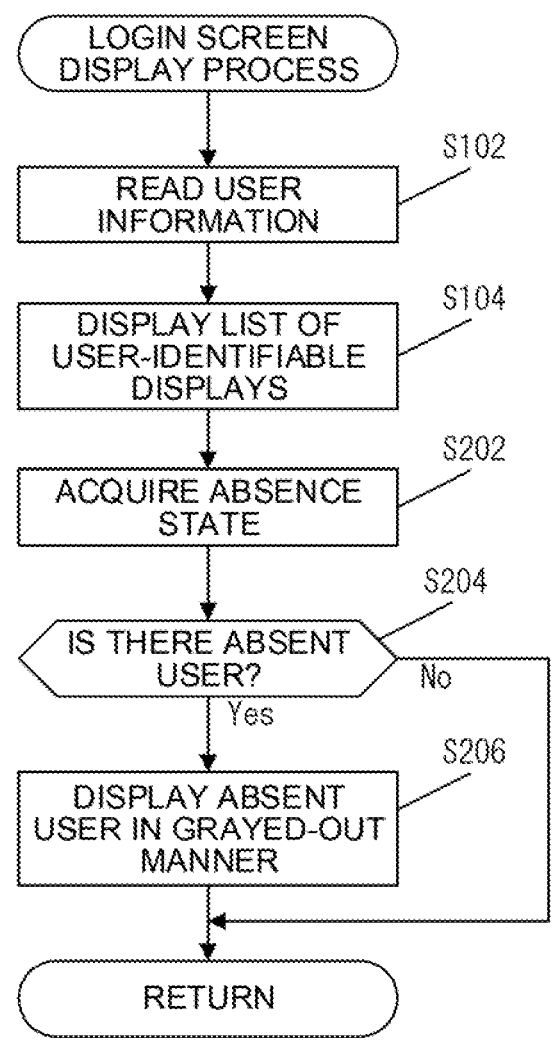
FIG. 10 is a flowchart for explaining a login screen display process according to a second embodiment.

In the present embodiment, the login screen display process in the first embodiment illustrated in FIG. 5 is replaced with a login screen display process in FIG. 10. The same processes are denoted by the same reference numerals, and description thereof will be omitted.

The controller 100 acquires the state of a user (step S202) after displaying a list of user-specific displays of users (steps S102 to S104).

If there is an absent user (a user in an absent state) among the users corresponding to the user-specific displays displayed in a list, based on the acquired user state, the controller 100 changes the display manner for the absent user (step S204; Yes → step S206). In the present embodiment, the absent user is displayed in a grayed-out manner.

Figure 11:
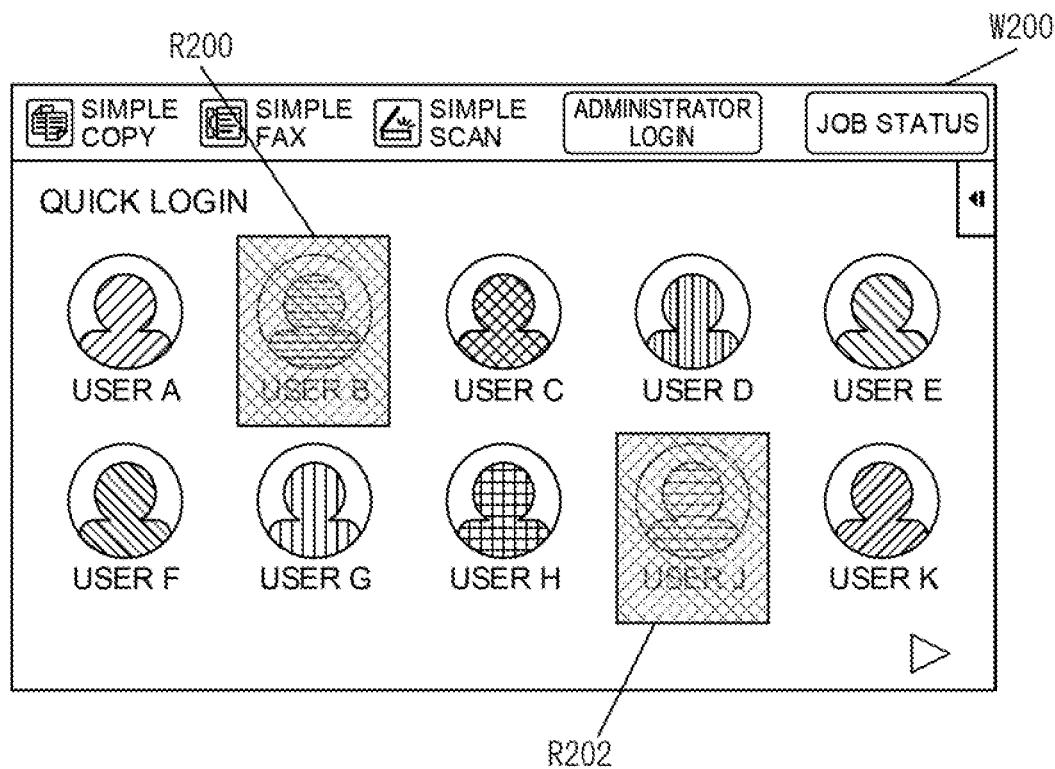
FIG. 11 is a diagram for explaining the operation of the login screen display process according to the second embodiment.

FIG. 11 is an example of a display screen W200 where the absent user is displayed in a grayed-out manner. In the display screen W200, a region R200 and a region R202 are displayed in a grayed-out manner. That is, the user identifies that users "user B" and "user J" are in the absent state.

It is noted that in addition to being displayed in a grayed-out manner, the display manner may be changed in color or brightness, for example. Further, identification information may be added without changing the display manner. For example, a character/image "absent" may be superimposed and displayed on the user-specific display.

The login screen is displayed while a display order of other users is remained unchanged. Therefore, the user logs into the apparatus simply by touching the user-specific display (for example, the icon) at a position recognized by the user as a user's own position even if there is an absent user.

In addition, the user may select or not may select the specific display for an absent user. For example, if the user selects a specific display whose display manner is changed due to the absent state of the user, the login display may be provided as is. On the other hand, the specific display whose display manner is changed due to the absent state of the user may not be selectable.

Further, an identifiable display for a present user may be provides with an identifiable display. For example, a brightness of the identifiable display for the present user may be increased, a size or a color of the identifiable display for the present user may be changed. In the present embodiment, it is possible to allow a user to easily visually recognize the presence or absence of a user in the login screen to provide a highly convenient login screen.

3. Third Embodiment

A third embodiment will be described. In the third embodiment, an absent user (a user who is highly likely not to use the apparatus) among users displayed in a list is hidden.

In the present embodiment, configurations common to those in the above embodiment will not be described, and description will be made with a focus on a different configuration and process.

Figure 12:
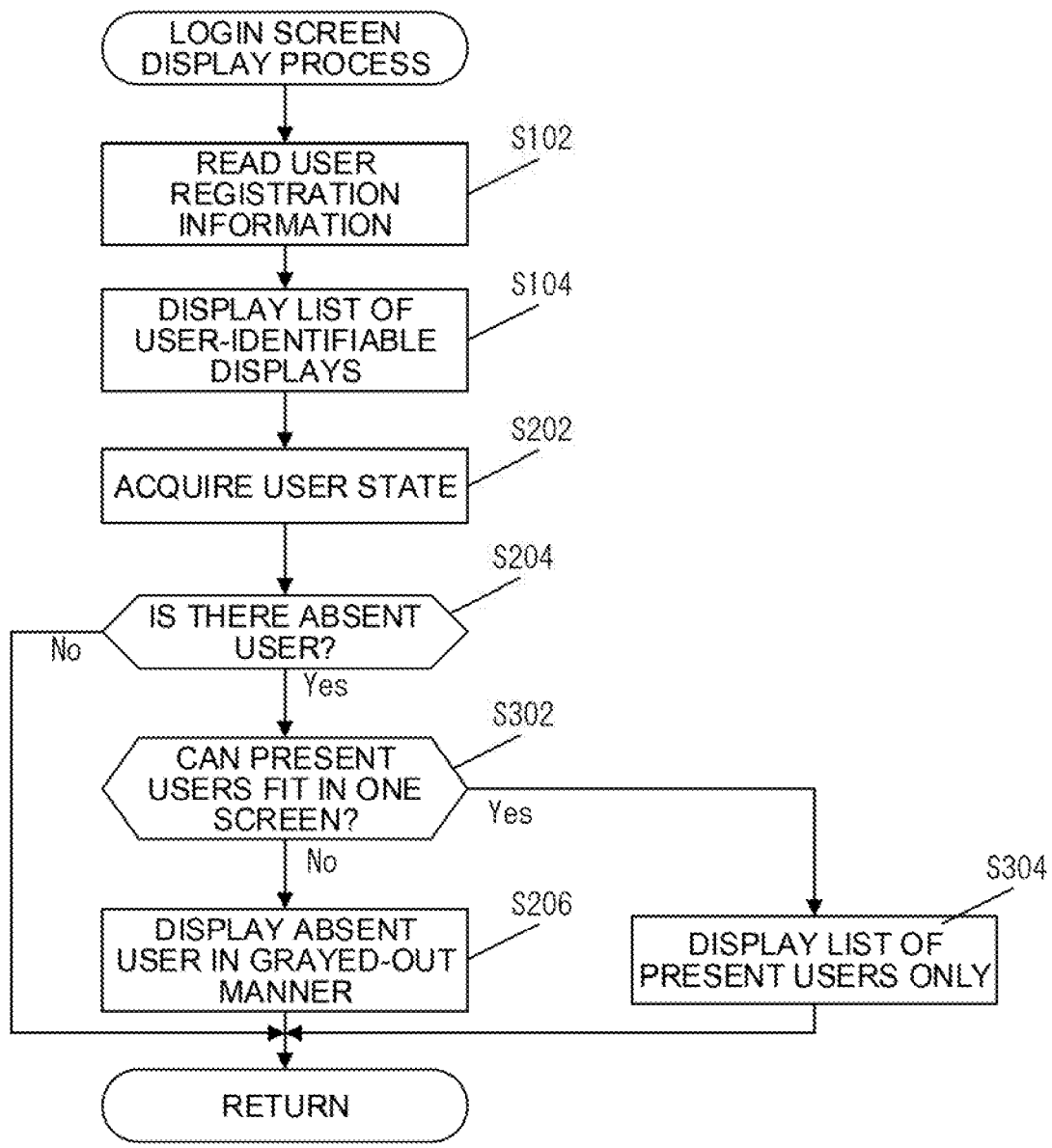
FIG. 12 is a flowchart for explaining a login screen display process according to a third embodiment.

In the present embodiment, the login screen display process according to the first embodiment illustrated in FIG. 5 and the login screen display process according to the second embodiment illustrated in FIG. 10 are replaced with a login screen display process illustrated in FIG. 12. The same processes are denoted by the same reference numerals, and description thereof will be omitted.

Here, it is assumed that an identifiable condition for hiding an absent user in the present embodiment depends on whether or not the number of present users is the number of users displayable within one screen.

For example, if 10 users are displayable in the login screen and the number of users other than a user in the absent state is equal to or less than 10 users, the user-specific display for the user in the absent state is hidden. Hereinafter, a specific flow of processing will be described with reference to FIG. 12.

After displaying the list of users (steps S102 to S104), the controller 100 acquires an absent state of a user (step S202).

If there is a user in the absence state (step S204; Yes), the controller 100 determines whether or not the number of present users (the number of users other than the user in the absent state) is the number of users displayable in one screen of the login screen (step S302).

If the number of present users is displayable in one screen, the controller 100 displays a list of only user-specific displays for the present users (step S302; Yes → step S304). That is, the absent user is hidden.

On the other hand, if the number of present users is not displayable in on one screen, the controller 100 displays the absent user in a grayed-out manner (step S302; No → step S206).

Figure 13A:
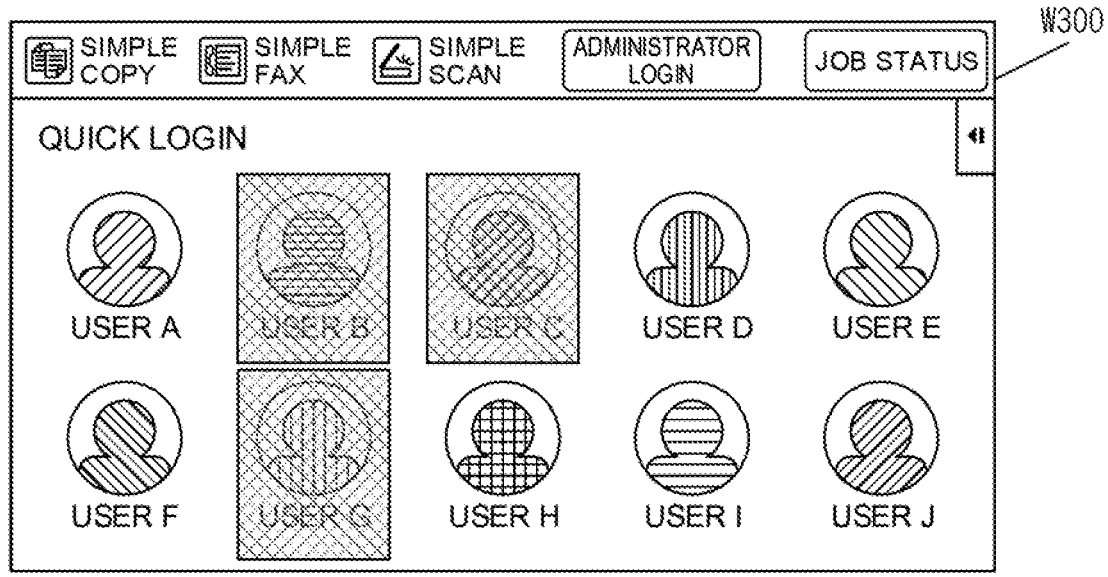
FIG. 13A, FIG. 13B, and FIG. 13C are diagrams each for explaining an operation of the login screen display process according to the third embodiment.
Figure 13B:
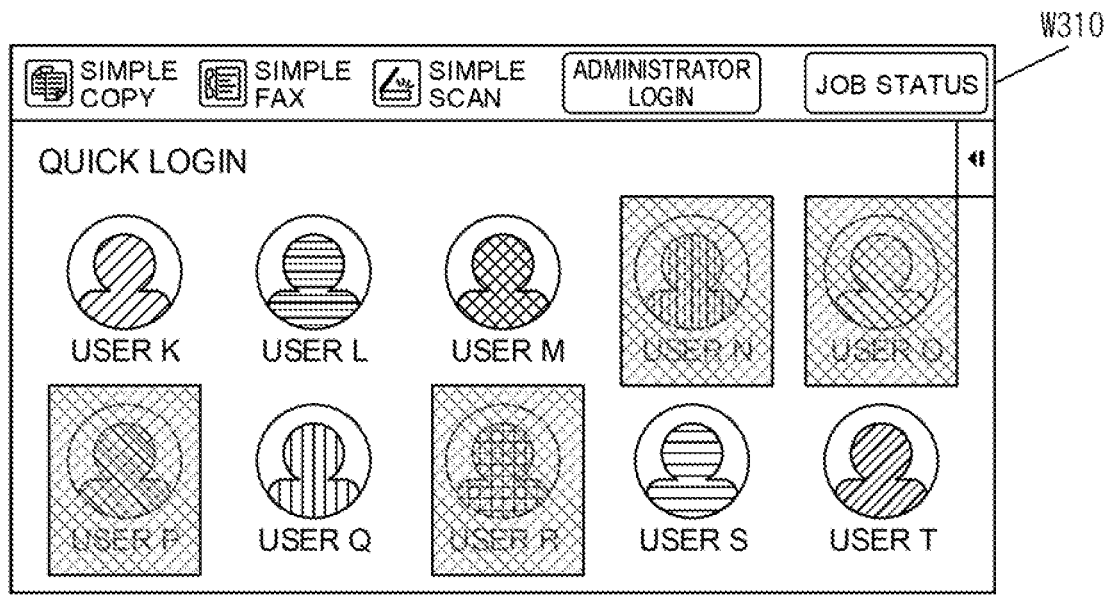
Figure 13C:
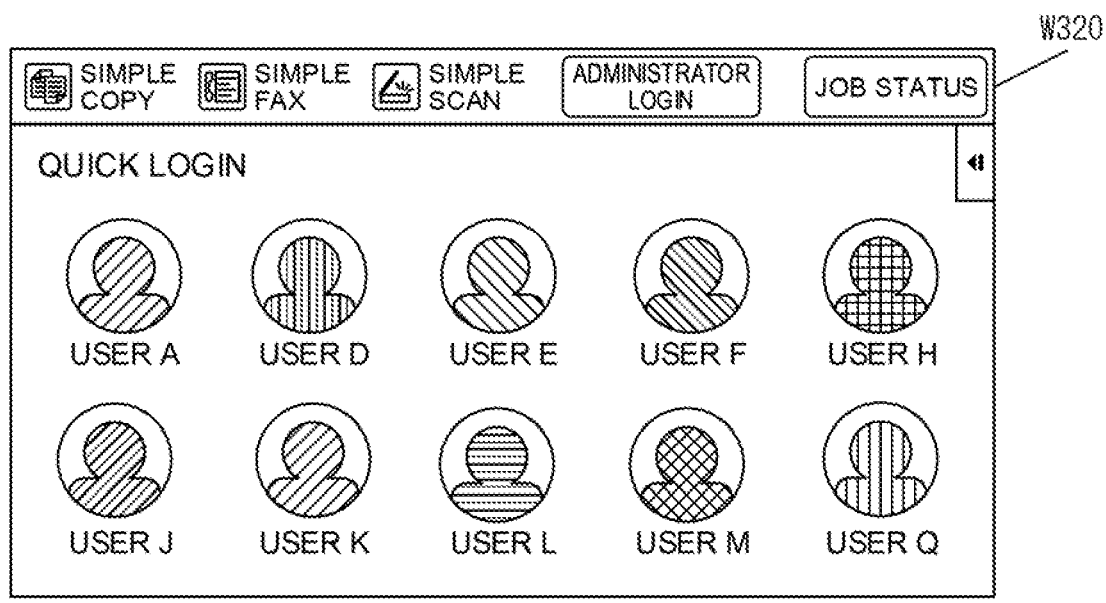

FIG. 13A, FIG. 13B, and FIG. 13C are diagrams each for illustrating an example of the display screen in the present embodiment. For example, users on the login screen are switched and displayed as in a display screen W300 in FIG. 13A and a display screen W310 in FIG. 13B.

Here, seven users "user B", "user C", "user G", "user N", "user O", "user P", and "user R" are absent. Therefore, there are 13 present users, and thus, the controller 100 switches and displays the display screen between two screens (FIG. 13A and FIG. 13B).

Further, if "user I", "user S", and "user T" are absent, there are 10 absent users. That is, there are 10 present users ("user A", "user D", "user E", "user F", "user H", "user J", "user K", "user L", "user M", and "user Q"), and thus, the 10 present users are displayable in the login screen. For example, as in a display screen W320 in FIG. 13C, all users are displayed in one screen.

As described above, according to the present embodiment, if the number of absent users increases, that is, the number of present users decreases, the controller 100 switches the user-specific displays of the absent users to "hidden" and displays the login screen. As a result, the number of users displayed is decreased so that the user easily finds his/her icon.

If there are many present users, it is more convenient for the user to select the user-specific display at the position remembered in the display screen (login screen). In this case, the user-specific display in the absent state is displayed in a changed display manner, and a state in which the position of the user-specific display is not changed is prioritized.

Further, whether or not to display/hide the identifiable display of the user in the absent state may be set by the user, or may be switched by a user operation. Further, for example, whether or not to display/hide may be switched and displayed at a timing when a task is input. In addition, if a predetermined time period elapses, whether to display/hide the identifiable display of the user in the absent state may be switched.

4. Fourth Embodiment

A fourth embodiment will be described. The fourth embodiment is different from the third embodiment in that whether or not to display users in one screen is further determined.

In the present embodiment, configurations common to those in the above embodiment will not be described, and description will be made with a focus on a different configuration and process.

Figure 14:
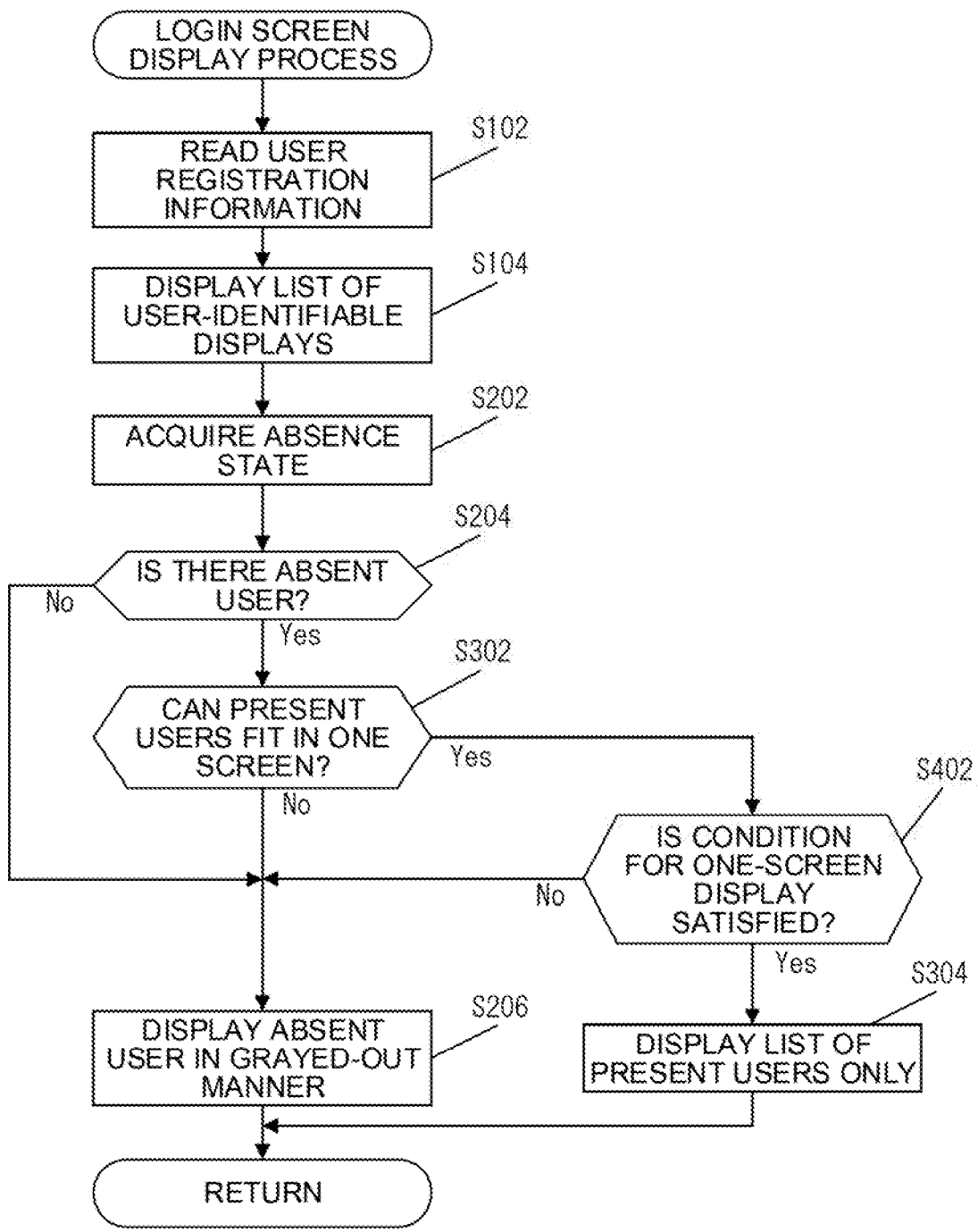
FIG. 14 is a flowchart for explaining a login screen display process according to a fourth embodiment.

In the present embodiment, the login screen display process of the third embodiment illustrated in FIG. 12 is replaced with a login screen display process in FIG. 14. That is, in FIG. 14, a process in step S402 is added to the processing in FIG. 12.

After the number of present users is displayable in one screen, the controller 100 determines whether or not a condition (display condition) for displaying the present users in one screen is satisfied (step S402). If the condition for displaying the present users in one screen is satisfied (step S402; Yes), the controller 100 displays a list of the present users only.

Here, in step S402, the controller 100 may make the determination based on a time period, for example. For example, if it is within business hours of a location where the image forming apparatus 10 is installed, a one screen display process may not be performed, and if out of the business hours, the one screen display process may be performed.

In addition to this, for example, only a user with a job may be displayed, or a user may be sorted according to the presence or absence of the job.

5. Fifth Embodiment

A fifth embodiment will be described. The fifth embodiment is different from the above-described embodiments in that specific displays for users are sorted.

In the above-described embodiments, the positions of the user-specific displays are fixed. However, depending on the user and the type of job, the user-specific displays may be sorted or displayed separately.

For example, a "sort button" is further displayed in the login screen. If the sort button is selected by the user, a user-specific display for a user with a job may be preferentially displayed. Moreover, the user-identifiable displays may be sorted according to the absence or presence of a user.

Moreover, a user with a job may be separately displayed in a separate region. For example, a user-specific display for a user with a job is displayed in a region other than a normal list display of user-specific displays. As a result, it is possible for the user to easily identify a user with a job.

6. Modification

Thus, the embodiments of the present invention are described in detail with reference to the drawings. However, the specific configuration is not limited to these embodiments, and the design and the like within the spirit of the present invention are also within the scope of the claims.

Further, in the above-described embodiments, a case where the login device according to the present invention is applied to an image forming apparatus such as a digital multifunctional apparatus is described, but it is needless to say that the login device can be applied to other apparatuses.

For example, if the login device is applied to an information processing apparatus, an acquired job includes transmitting and receiving an electronic mail, downloading a program, and executing a printing process. That is, the job manager 104 manages a job corresponding to an apparatus for which the login device executes a login process.

In addition, a program operating in each of the devices in the embodiments is a program (a program for making a computer function) for controlling a CPU and the like to realize the functions of the above-described embodiments. Information items processed by these devices are temporarily stored in a temporary storage device (such as a RAM) at the time of processing the information items, and then, stored in storage devices such as various ROM, HDD, and SSD, and read, or corrected/written by a CPU as necessary.

In addition, when being distributed to the market, the program can be stored and distributed in a portable recording medium, or transferred to a server computer connected via a network such as the Internet. In this case, of course, a storage device of the server computer is also included in the present invention.

DESCRIPTION OF REFERENCE NUMERALS

10 Image forming apparatus
100 Controller
102 Login processor
104 Job manager
110 Storage
112 User information storage region
114 Icon image storage region
116 Job storage region
118 Quick login program
140 Image inputter
150 Image former
160 Display device
170 Operation processor
180 Communicator

What is claimed is:

1. A login device comprising:
a controller that executes instructions stored in a memory;
a storage that stores a plurality of users capable of a login; and
a display device, wherein:
the controller displays specific displays corresponding to the plurality of users at positions each of which is fixed for each of the plurality of users in the display device,
the controller acquires whether a user is in an absent state,
if a number of users other than the user in the absent state is greater than a number of users displayable in the display screen, the controller provides the specific display for the user in the absent state at a fixed position, said specific display being displayed so as to be able to identify that the user is in the absent state,
if the number of users other than the user in the absent state is equal to or less than the number of users displayable in the display screen, the controller does not provide the specific display for the user in the absent state,
the controller executes a login process with a user corresponding to a specific display selected from the displayed specific displays, and
if job data including user information is acquired, the controller provides an identifiable display on a specific display for a user corresponding to the user information.

2. The login device according to claim 1, wherein:
the storage further stores a display condition,
the controller does not provide the specific display for the user in the absent state if the display condition is satisfied, and
the controller changes a display manner of the specific display for the user in the absent state and displays the display manner of the specific display in the display device if the display condition is not satisfied.

3. A login device for logging into a processing device, the login device comprising:
a controller that executes instructions stored in a memory; and
a storage that stores a plurality of users capable of a login, wherein:
the controller displays specific displays corresponding to the plurality of users,
the controller executes a login process with a user corresponding to a specific display selected from the displayed specific displays,
the controller determines whether the user is in a state of operating a processing device as a user state,
the controller changes a display manner of a specific display corresponding to a user and displays the display manner of the specific display without changing an order of displaying, according to whether a state of the user is capable of operating the processing device,
if a number of users capable of operating the processing device is greater than a number of users displayable in the display screen, the controller provides the specific display for the user not capable of operating the processing device at a displayed position, said specific display being displayed so as to be able to identify that the user is not capable of operating the processing device, and
if the number of users capable of operating the processing device is equal to or less than the number of users displayable in the display screen, the controller does not provide the specific display for the user not capable of operating the processing device.

4. A display method in a login device including a storage that stores a plurality of users capable of a login, the method comprising:
displaying, in a display screen at a position fixed for each of the plurality of users, specific displays corresponding to the users;
acquiring whether a user is in an absent state,
providing, if a number of users other than the user in the absent state is greater than a number of users displayable in the display screen, the specific display for the user in the absent state at a fixed position, said specific display being displayed so as to be able to identify that the user is in the absent state,
not providing, if the number of users other than the user in the absent state is equal to or less than the number of users displayable in the display screen, the specific display for the user in the absent state, and
executing a login process with a user corresponding to a specific display selected from the displayed specific displays, wherein
if job data including user information is acquired, an identifiable display is provided on a specific display for a user corresponding to the user information.

5. A display method in a login device including a storage that stores a plurality of users capable of a login, the login device for logging into a processing device, the method comprising:
displaying specific displays corresponding to the plurality of users;
executing a login process with a user corresponding to a specific display selected from the displayed specific displays; and
determining as a state of the user whether the user is in a state of operating a processing device, wherein
a display manner of a specific display corresponding to a user is changed and is displayed without changing an order of displaying, according to whether the user is capable of operating the processing device,
if a number of users capable of operating the processing device is greater than a number of users displayable in the display screen, the specific display for the user not capable of operating the processing device is provided at a displayed position, said specific display being displayed so as to be able to identify that the user is not capable of operating the processing device, and if the number of users capable of operating the processing device is equal to or less than the number of users displayable in the display screen, the specific display for the user not capable of operating the processing device is not provided.

6. The login device according to claim 1, wherein:

if a time when the controller displays the specific display for the user in the display device is included in a predetermined time of a day, the controller changes a display manner of a specific display for the user in the absent state and displays in the display device the display manner of the specific display, and if a time when the controller displays the specific display for the user in the display device is not included in the predetermined time of the day, the controller does not display a specific display for the user in the absent state.

* * * * *